April 21, 1959     R. L. BIESELE, JR     2,882,785
PHOTOELECTRIC GRADING INSTRUMENT Filed May 28, 1953     9 Sheets-Sheet 1

INVENTOR.
RUDOLPH L. BIESELE, JR.

ATTORNEYS.

April 21, 1959　　R. L. BIESELE, JR　　2,882,785
PHOTOELECTRIC GRADING INSTRUMENT
Filed May 28, 1953　　9 Sheets-Sheet 2

INVENTOR.
RUDOLPH L. BIESELE, JR.
BY
ATTORNEYS

April 21, 1959   R. L. BIESELE, JR   2,882,785
PHOTOELECTRIC GRADING INSTRUMENT
Filed May 28, 1953   9 Sheets-Sheet 4

INVENTOR.
RUDOLPH L. BIESELE, JR.

BY Morgan Finnegan, Durham and Pine
ATTORNEYS

April 21, 1959 R. L. BIESELE, JR 2,882,785
PHOTOELECTRIC GRADING INSTRUMENT
Filed May 28, 1953 9 Sheets-Sheet 5

INVENTOR.
RUDOLPH L. BIESELE, JR.
ATTORNEYS

April 21, 1959     R. L. BIESELE, JR     2,882,785
PHOTOELECTRIC GRADING INSTRUMENT
Filed May 28, 1953     9 Sheets-Sheet 9

INVENTOR.
RUDOLPH L. BIESELE, JR.
ATTORNEYS.

United States Patent Office 2,882,785
Patented Apr. 21, 1959

2,882,785

PHOTOELECTRIC GRADING INSTRUMENT

Rudolph L. Biesele, Jr., Dallas, Tex., assignor, by mesne assignments, to DSP Corporation Application May 28, 1953, Serial No. 357,955

22 Claims. (Cl. 88—14)

This invention relates to a photoelectric system for measuring physical characteristics of materials and particularly raw fibrous products such as cotton and the like.

While the general usefulness of this invention will become apparent as the description proceeds, for simplicity the method and apparatus will be described in connection with the inspection and grading of cotton as it involves the correlation of a relatively large number of measurements for final grade determinations. At the present time raw cotton is divided into many separate classes and grading or classification is based on such quantities as reflectance, color, uniformity of preparation and presence of foreign matter, such as leaf particles, trash and dirt.

Some efforts have been made to develop faster and more reliable grading or classifying techniques and eliminate the human error. Probably the major effort has been in the measurement of reflectance and color characteristics, the latter having been accomplished by means of photoelectric apparatus partially using a tristimulus or trichromatic system for color grading. While these devices constituted an improvement over the older judging techniques using physical specimens they present some difficulties in standardizing the equipment.

Reflectance and color measurements of the sample must be supplemented by measurement of characteristics of the sample, and particularly the uniformity of preparation and the amount of leaf and trash. Samples of cotton and similar raw materials that are not properly processed contain tangles, lumps, knits and similar defects that cause bunching of the fibers. It has been found that this bunching will cause higher reflectance than well prepared sections of the sample. Similarly, the presence of foreign matter such as leaves and trash will influence the overall color readings to an appreciable extent so that the color readings while accurate in themselves do not necessarily present an accurate measurement that can be used directly for the grading of samples.

It has been found that the above mentioned difficulties inherent in prior devices and methods can be overcome by providing means that will accurately measure all qualities and characteristics so that the readings can be compared one with the others to provide more exact grading of the sample notwithstanding the fact that one or more readings in and of themselves may not present a true picture.

These ends have been attained by measuring, automatically, the leaf and trash content of the sample as well as the uniformity of preparation which when considered with color and reflectance readings provide extremely accurate means for grading and classifying purposes. Actual tests have shown that this invention provides a more sensitive indicator than prior equipment and methods and affords means whereby more accurate grading of cotton is obtainable than that presently employed in commercial practice.

Accordingly it is one object of the invention to provide apparatus that will not only grade cotton and other fibrous and solid materials pursuant to commercial grades, but provide means for determining intermediate grades and for accurately selecting materials having certain desired characteristics notwithstanding such commercial grades or classifications.

Another object of the invention is a new and improved method and apparatus for measuring leaf and trash content of the sample or color irregularities in the sample, together with the state of roughness or degree of preparation which together with color and reflectance determinations affords an accurate classifying device.

Still another object of the invention is an optical classification system for cotton and other materials wherein the correlation of the several readings will directly indicate the classification of the sample under test.

A further object of the invention is an improved system for scanning samples of material to effect an evaluation of leaf and trash content, or uniformity of preparation of the sample, or both, and wherein the means for effecting these ends is stable and dependable and will maintain its calibration over relatively long periods of time.

Still another object of the invention is a new and improved electron switch and associated timing means that provides a simple, stable and dependable device capable of operation over relatively long periods of time and which is substantially independent of changing characteristics of the tubes and wherein switching transients are entirely eliminated.

A further object is a highly stable electronic scanning device for measuring at least two different characteristics of the material scanned thereby and presenting the readings substantially instantaneously in terms that can be directly correlated with other readings such as color, reflectance and the like.

A further object is a device and method for scanning materials to detect externally visible defects or color variations, which may be darker, lighter or of a different color from the remainder of the surface, such as oil spots or other blemishes in paper, diseased areas in tobacco leaf, specks in ceramic surfaces, or defects in coated sheets.

The above and other objects and advantages of the invention will become more apparent from the following description and accompanying drawings forming part of this application.

Briefly this invention comprises a plurality of photoelectronic devices for measuring certain physical characteristics of the raw cotton on other material to be tested. These measurements are preferably performed simultaneously and in a manner that will afford easy correlation and enable direct indication of the grade of the sample. More specifically direct readings are made of yellow and red-purple content of the sample, reflectance, leaf and trash content and uniformity of preparation and the indicator scales may be calibrated in accordance with commercial standards such as those of the United States Department of Agriculture for cotton so that the classification of the sample can be immediately determined. In this way measurements of factors in addition to those of color and reflectance become immediately available and provide an accurate determination of factors, such as leaf content and uniformity of preparation, so that more accurate grading is possible. Tests have indicated that there is much overlapping between adjacent commercial grades of cotton for each of the measured characteristics. This fact, plus the additional fact that the grade standards cover only a limited segment of an infinite number of possible combinations of characteristics not only provides for a very simple determination of grade but also greatly facilitates the comparison of samples and selecting samples falling within well defined limits not possible with prior devices to my knowledge.

In the embodiment of the invention both the leaf and trash content as well as the uniformity of the preparation of the sample are measured by means of a single image pick-up tube arranged to scan the sample under test. The resultant video signal is then modified and treated to provide accurate indications of both preparation and the quantity of trash. The color and reflectance readings are obtained by means of barrier layer photo cells that have been found to provide a high degree of accuracy and stability over long periods of time. The cells are arranged to provide a direct reading of the quantity measured and in the case of reflectance and color the reading is virtually independent of changes in illumination caused by slight voltage variations and aging of the lamps.

Figure 1:
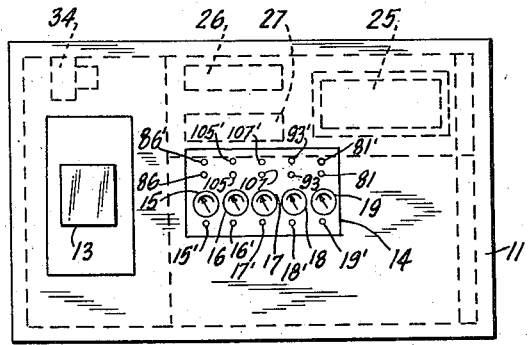
Figure 1 is a plan view of one form of apparatus in accordance with the invention.
Figure 2:
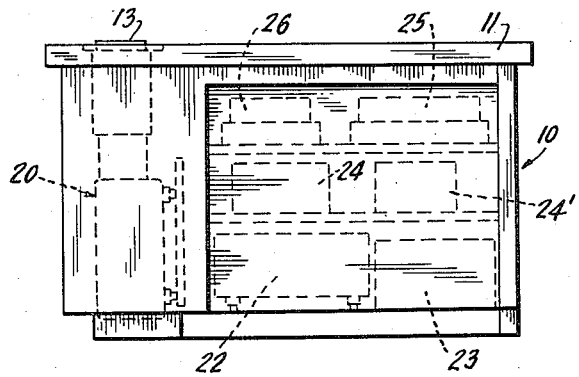
Figure 2 is a front elevation of the apparatus shown in Figure 1.
Figure 3:
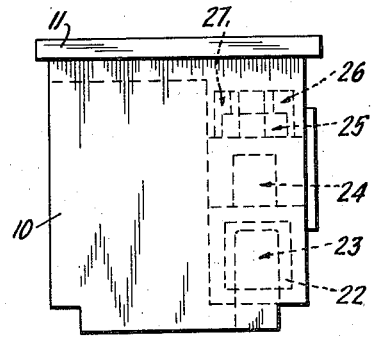
Figure 3 is a side elevation of the apparatus of Figure 1.

Figures 1, 2 and 3 of the drawings illustrate one embodiment of the invention which houses the equipment required to make the necessary physical measurements of a cotton sample and determine its class or grade as discussed above. The equipment is housed within a cabinet 10 having a flat top 11 containing a window 13 on which the sample to be tested is placed and indicating panel 14 containing 5 indicators 15–19 inclusive for indicating the five different characteristics of raw cotton normally required for grade determination.

The equipment contained within the cabinet 10 is indicated generally by dotted outlines to show their relative positions. The numeral 20 denotes the camera and its associated equipment. The power supply together with means for generating the scanning voltages for the image dissector tube within camera 20 is contained within the housing 22 and a regulated high voltage power supply is disposed within housing 23. The housings 24 and 24' are static type voltage regulators, while the housings 26 and 27 contain electronic amplifiers for amplifying the signals produced by two sets of photocells responsive to color components of the material under test. The housing 25 includes equipment for amplifying and treating video signals generated by the image dissector tube in camera 20 to indicate the uniformity of preparation and trash content of the sample undergoing examination.

Figures 4, 4A:
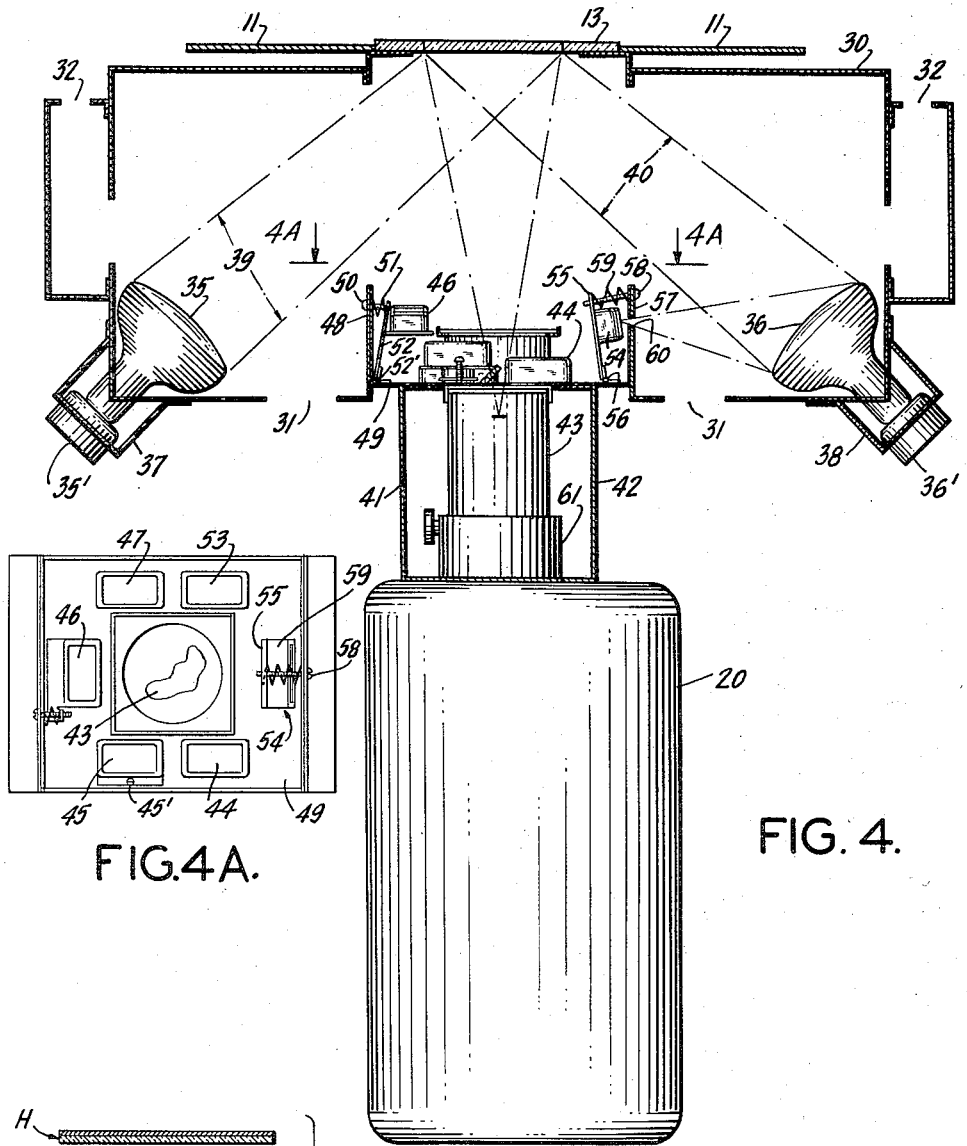
Figure 4 is a cross-sectional view of the light sensitive apparatus responsive to predetermined characteristics of the material to be tested.
Figure 4A is a plan view of the apparatus of Figure 4 taken along the line 4A—4A thereof.

Figures 4 and 4A are two views of the camera equipment and associated photoelectric apparatus for testing a sample of material as previously described. In Figure 4 a broken section of the top 11 on the cabinet 10 is illustrated on each side of the transparent window 13. Directly beneath this window is a light-proof housing 30 having air inlet openings 31 on the bottom side thereof and air vents 32 on each side to facilitate circulation of air and remove the heat generated within the housing. The entire housing is ventilated by means of an exhaust fan 34 shown in Figure 1. A pair of incandescent lamps 35 and 36 are disposed in the lower left and right hand corners of the housing 31 and supported by sockets 35' and 36' mounted on brackets 37 and 38 respectively. These lights include built-in reflectors and are positioned to direct their light on the under-side of the transparent window 13 as indicated by the broken lines 39 and 40 to illuminate the sample. The sockets 35' and 36' provide means for making necessary electrical connections to the lamps. The camera 20 which includes the image dissector tube, its associated electronic circuits and a suitable lens is supported in an upright position by means of housing walls 41 and 42, fastened at their lower ends to the housing 20 and at their upper ends to the underside of the housing 30. The lens assembly 43 of the camera 20 projects through an opening in the housing 30 between the walls 41 and 42 and is focussed on the underside of the sample supported on the transparent window 13.

Surrounding the lens assembly 43 are photocells 44 and 45 which in this embodiment of the invention are arranged with appropriate filters to record the red-purple light reflected from a sample placed over window 13. For this purpose the photocell 44 is provided with an amber filter while the photocell 45 is provided with a green filter. As will be pointed out, these cells are connected in opposition and produce a difference signal proportional to the color of the reflected light to which they are responsive. In this way the admixture of red-purple light reflected from the sample is determined. Photocell 45 is provided with an adjusting screw 45' to tilt the cell relative to cell 44 and thus balance the readings of both cells when a standard sample is placed over window 13.

A second pair of photocells 46 and 47 is arranged to receive light from the sample being tested to measure the admixture of yellow in the reflected light. The photocell 46 is mounted on a bracket 52 pivoted at 52' and extending upwardly from the base 49 of housing 30. The upper end of bracket 52 is connected to the upwardly extending wall 48 by means of a screw extending through the wall 48 and threadably engaging the bracket 52. A spring 51 urges the bracket 52 away from wall 48 so that rotation of the screw 50 in one direction or the other will move the bracket or mount 52 toward and away from the wall 48 and thereby move the photocell 46 through a corresponding angle and relative to the window 13. The photocell 47 is fixedly mounted on the plate 49 diagonally opposite the photocell 44 previously described. The photocells 46 and 47 are fitted with green and blue filters respectively and are connected in bucking relationship to produce a difference signal corresponding to the yellow light produced by the sample, and the output of the cells may be balanced by adjustment of screw 50 and the corresponding movement of cell 46.

The third pair of photocells 53 and 54 are arranged to measure the reflectance or brightness of the sample. The cell 54 is mounted on an arm 55 pivoted at 56 to the plate 49. The arm 55 is coupled with the upright wall 57, extending upwardly from the bottom of the housing 30, by means of a screw 58 passing through the wall 57, and threadedly engaging arm 55. A spring 59 surrounding the screw 58 is disposed between the members 57 and 55 to hold them apart. The face or operating surface of the photocell 54 is directed through an opening 60 in the wall 57 which is substantially in line with the face of the incandescent lamp 36. This photocell therefore receives light directly from the bulb 36 and the amount of light falling on the cell can be adjusted by means of the adjusting screw 58. The co-operating photocell 53 is fixedly mounted on the plate 49 and is positioned to receive reflected light from the transparent window 13. These cells 53 and 54 are also connected in opposition so that each tends to cancel voltage generated by the other. The physical adjustment of the cell 54 is accomplished by placing a light reflecting material having substantially perfect reflectivity over the window 13 so that substantially all of the light passing through the window 13 is reflected to photocell 53. The cell 54 is adjusted by means of the screw 58 so that substantially zero difference reading is obtained and which indicates that the same amount of light is falling on the photocell 54 as that falling on photocell 53. If the reflected material covering window 13 is then removed and a sample of material to be tested substituted therefor, the photocell 53 will receive less light than the photocell 54 and this difference is a direct measurement of the reflective property of the sample placed over the window.

Adjustment or focussing of the image of the sample on the camera tube within housing 20 is attained by means of the lens 43 which is movable inwardly or outwardly of the collar 61 on the upper side of the housing 20. Inasmuch as this focussing procedure as well as the structure of a suitable lens system is well known in the art, a detailed description is not believed to be necessary.

Figure 5:
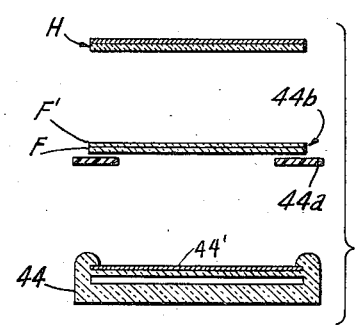
Figure 5 is a cross-sectional view of a photocell and filter for use with the light sensitive apparatus of Figure 4.

As described above, photocells 44, 45, 46 and 47 were indicated as being provided with light filters in order to determine the admixture of yellow and red-purple in the cotton sample. Figure 5 illustrates a typical arrangement of a cell, for instance cell 44, with its associated filters. Immediately above the light sensitive face 44' of cell 44 is a defining aperture 44a and a light filter 44b. Light filters are usually formed of two or more layers of colored glass F and F' which when combined give the desired characteristics. In instances where the quantity of red and infrared light falling on the cell is great, it may be necessary to employ a heat absorbing filter H to block out these rays. In the case of the photocell 54 for instance such a protective filter is employed along with the aperture 60 to protect the cell from damage caused by the heat radiated from lamp 36.

Figure 6:
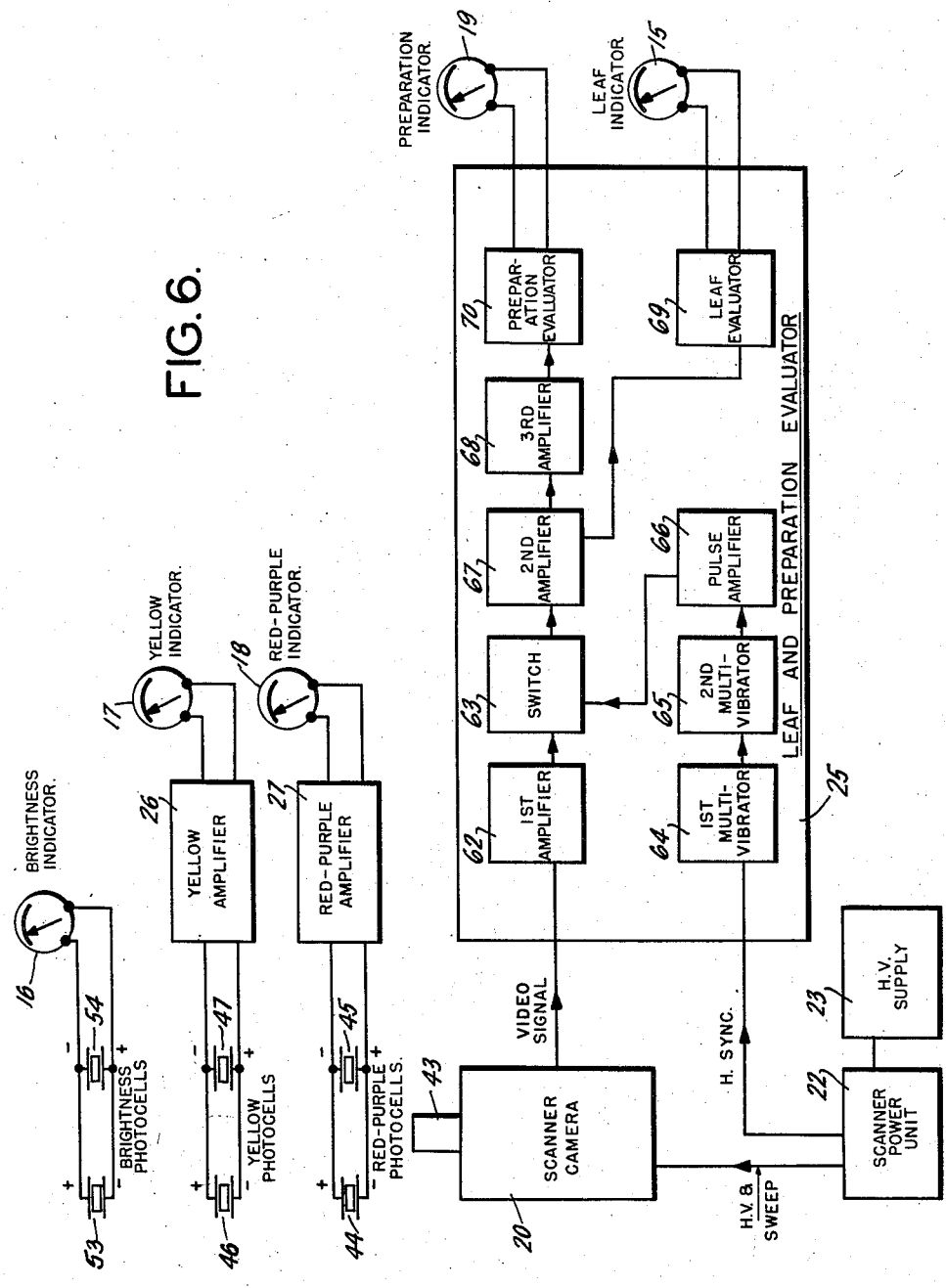
Figure 6 is a block diagram of the invention showing the relationship of the several elements thereof.

The equipment for the measurement of the several properties of a sample of raw cotton or other material to determine the classification or grade is illustrated generally in Figure 6 which shows the relationship and association of the component parts. The six photocells 44 through 47, 53 and 54 are shown in the upper left hand section of this drawing. The brightness or reflectance photocells 53 and 54 are connected in opposition with the resultant signal being fed directly to the brightness indicator 16 which is mounted on the panel 14 as illustrated in Figure 1. The cells for measuring the yellow light reflected by the sample, namely 46 and 47, are also connected in opposition and the signal developed by these cells is amplified by the yellow amplifier 26 which in turn feeds the yellow indicator 17. Similarly the red-purple cells 44 and 45 develop a signal that is amplified by the red-purple amplifier 27 and which in turn actuates red-purple indicator 18. A scanning camera 20 containing the image dissector tube and the lens 43 is energized by the scanner power unit 22 and the high voltage power supply 23 and produces a video signal that is fed to the leaf and preparation evaluator circuits contained within the housing 25.

In the leaf and preparation evaluating unit 25 the video signal is first amplified by amplifier unit 62 and is then fed to an electronic switch 63. Simultaneously, a portion of the horizontal sync voltage which is fed to the camera 20 for the purpose of producing scanning in the image dissector tube is also fed to the first multi-vibrator unit 64. This multi-vibrator unit together with the second multi-vibrator unit 65 produces a timing pulse in synchronism with each alternate horizontal sync pulse. This timing pulse is then fed to the pulse amplifier 66 which reverses its phase and applies it to the electron switch 63. The action of this timing pulse is to remove portions of the video signal which carry unwanted transients that interfere with the measurement of leaf and trash content and uniformity of preparation of the sample. The selected portion of the video signal is then fed to the second amplifier 67 which feeds both the third amplifier 68 and the leaf evaluator circuit 69. The third amplifier 68 is coupled with a preparation evaluator circuit 70 which in turn actuates the associated indicator 19 while the leaf evaluator circuit 69 actuates its indicator 15. The separation of these two signals appearing on indicators 15 and 19 is attained by means of rectifying circuits that will be described more fully in connection with the discussion of the detailed circuits. It is apparent however, that the presence of leaf or trash in the cotton will cause a reduction in the light directed onto the photocathode of the image dissector tube and thus produce an excursion of one polarity in the video signal. On the other hand, if the sample is not properly prepared and some of the fibers are pressed tightly together they will reflect more light than other parts of the sample and thus produce an excursion of another polarity in the video signal. By properly rectifying these signals it is apparent that they can be separated to produce individual indications.

Figure 7:
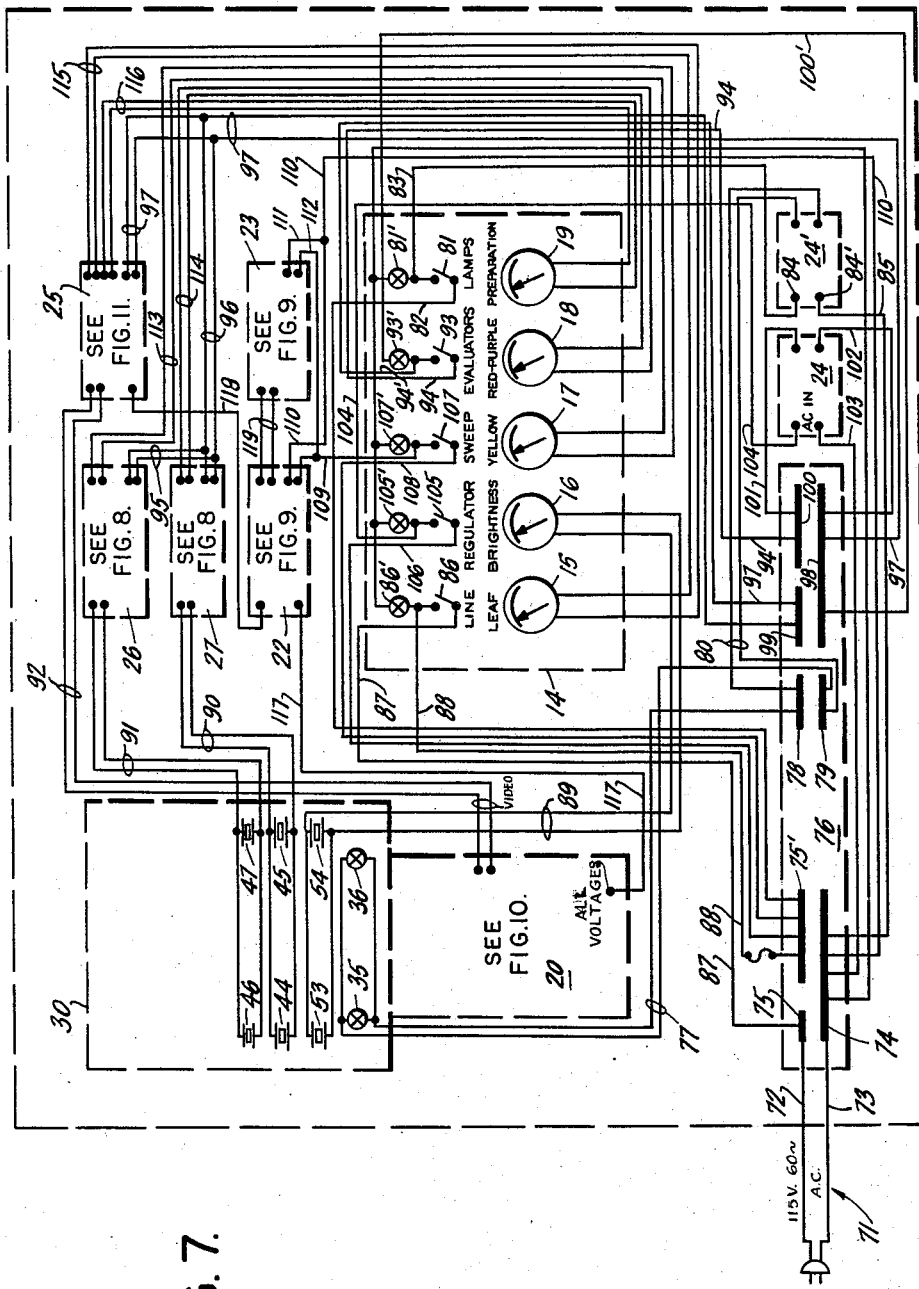
Figure 7 is a wiring diagram of photoelectric measuring and recording apparatus in accordance with the invention.

The composite wiring diagram of the component parts of the invention is illustrated in Figure 7 with the components being illustrated by means of dotted outlines containing references to the specific figures showing their circuit details.

The equipment is powered by a suitable source of alternating current fed to the apparatus by a conventional cable and plug assembly 71 having a pair of conductors 72 and 73 connected to terminals 74 and 75 of the terminal strip 76. While alternating current is preferred it will, however, become apparent that any other type of power source may be utilized. In some instances it may be desirable to interpose in the cable 71 a voltage regulator to provide a relatively constant voltage to the equipment and thereby avoid some inaccuracies that may result therefrom. While the equipment has been designed to compensate for slight variations in line voltage substantial variations may have some effect.

The incandescent lamps 35 and 36 for illuminating the sample on the test are connected in parallel and energized by a pair of wires 77 connecting the lamps with terminals 78 and 79 of the terminal strip 76. These terminals are in turn connected through a pair of leads 80 to a static voltage regulator 24' to maintain a constant voltage on the lamps notwithstanding slight variations in the main supply. A switch 81 on the control panel 14 controls the supply of energy to these lamps. One side of the switch 81 is connected through a conductor 82 to the terminal 75' of the terminal strip 76, while the other side of the switch is connected through a lead 83 to a terminal 84 of the regulator 24'. The other terminal 84' of regulator 24' is returned by a lead 85 to the terminal 74. Line switch 86 which controls the supply of energy to all of the components is connected by leads 87 and 88 to the terminals 75' and 75 respectively. Therefore closing of the line switch 86 applies energy to the terminals 74 and 75' and closure of the lamp switch 81 will then energize the voltage regulator 24' to illuminate the lamps 35 and 36.

The photocells 53 and 54 which measure the property of reflectance as previously described, are connected through a pair of leads 89 directly to the brightness indicator 16 on the control panel 14. The red-purple photocells 44 and 45 are connected to the red-purple amplifier 27 by a pair of conductors 90. Similarly, the yellow photocells 46 and 47 are connected by a second pair of conductors 91 to its amplifier 26. The output of the camera and associated electronic equipment illustrated by the dotted outline 20 is fed to the evaluator equipment 25 by means of a pair of leads 92. While the pairs of leads 89, 90, 91 and 92 are illustrated as independent conductors it may be desirable to use shielded conductors or coaxial cable in order to shield these circuits from extraneous signals.

Amplifiers 26 and 27 and the evaluator 25 are simultaneously energized by means of the evaluator switch 93. The A.-C. inputs of these equipments are connected in parallel by the pairs of leads 95, 96 and 97 with leads 97 being connected to terminals 98 and 99 of the terminal strip 76. Closure of the switch 93 connects the lead 94 which is attached to terminal 100 of terminal strip 76 with the lead 94' which is connected to the terminal 99 of strip 76. This completes the power circuits from the amplifiers 26 and 27 and the evaluator 25 to the regulator 24 which is connected with the terminals 98 and 100 by means of leads 101 and 102. The input to the regulator 24 is accomplished by means of the lead 103 which connects the regulator with the power terminal 74 and the lead 104 which is connected to one side of the regulator switch 105. The other side of the switch 105 is connected by means of a lead 106 to the power terminal 75'. To energize amplifiers 27 and 28 and evaluator 25 the power or line switch 86 is first closed and then the regulator switch 105 is closed to energize the regulator 24. After this is accomplished the evaluator switch 93 is then closed to apply energy to the aforementioned components.

The high voltage power supply 23 and the sweep circuits for the camera equipment 20 are controlled by the switch 107. One side of this switch is connected via the lead 108 to the power terminal 75' while the other side of the switch is connected by the lead 109 to one A.-C. terminal on the sweep generator 22. The other side of the power input of this generator is connected via a lead 110 to the power terminal 74 of the terminal strip 76. The high voltage power supply 23 is connected in parallel with the sweep generator 22 by means of conductors 111 and 112.

In order to facilitate the operation of this equipment indicating lamps or pilot lights are mounted on the panel 14 in association with the control switches to indicate when its associated switch is in the "on" or "off" position. These lamps are denoted by the same numerals as their associated switches except that the numerals indicating the lamps are primed, as for instance, the lamp 86' is associated with the switch 86, etc.

With reference to the indicator circuits the signal output of the yellow amplifier 26 is connected to its indicator 17 by means of a pair of leads 113 and the red-purple amplifier 27 is similarly connected to its indicator 18 by conductors 114. The evaluator circuit is provided with a pair of output circuits to indicate leaf content and uniformity of preparation. The leaf indicator 15 is therefore connected to the evaluator 25 by a pair of conductors 115 while the preparation indicator 19 is connected by a separate pair of wires 116.

The operating voltages for the camera equipment 20 are supplied by a multi-conductor cable 117 leading from the sweep generator 22 to the camera equipment 20. A horizontal sync signal is also fed to the evaluator equipment 25 from the sweep generator 22 by means of a separate lead 118. The high voltage supply 23 is connected to the sweep generator 22 by a pair of conductors 119 and this voltage is then fed to the camera unit via an individual conductor and ground within the cable assembly 117.

Having described the general layout and arrangement of the individual components of this invention, the circuit details and operation of each component will now be discussed.

Figure 8:
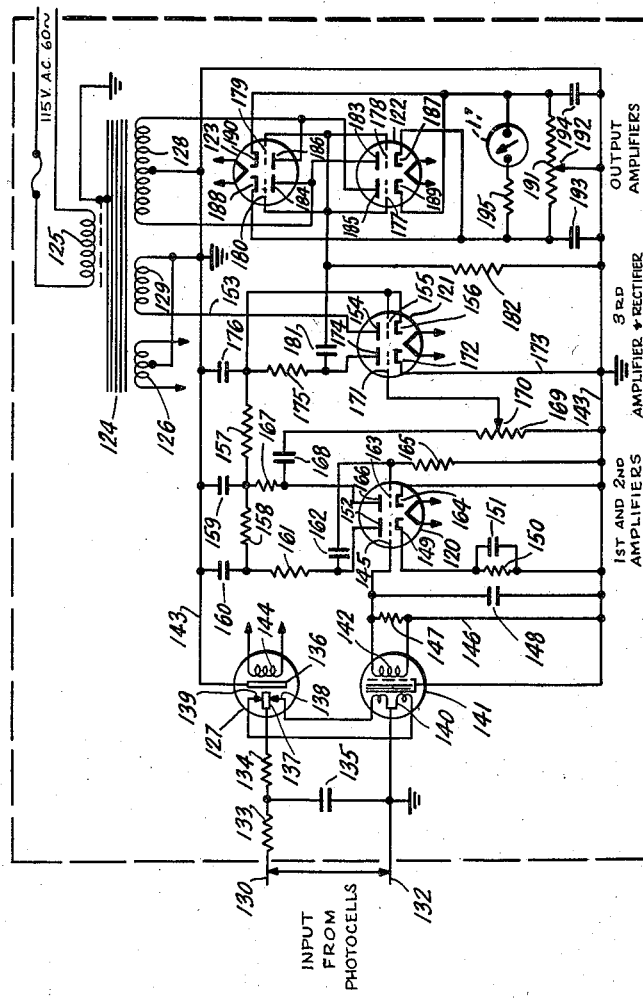
Figure 8 is a circuit diagram of a photocell amplifier.

The yellow and red-purple amplifiers 26 and 27 for amplifying the differential signals of the respective photocells 46—47 and 44—45 are identical and therefore only one amplifier is illustrated in Figure 8. This amplifier includes four duo-triodes 120, 121, 122 and 123. It also includes an integral power supply comprising a transformer 124 for producing the various voltages necessary for the operation of the tubes and a rectifier comprising one triode section of the tube 121.

Alternating current is fed to the primary winding 125 of the transformer 124 which produces a low voltage on winding 126 for heating the filaments of the tubes and actuating a vibrator 127 and two high voltages on windings 128 and 129 to supply the anode voltages for the tubes. The input signal is applied between the leads 130 and 132 and in the case of the yellow amplifier these leads would represent the pair of leads 91 of Figure 7, while in the case of the red-purple amplifier these leads would represent the pair of leads 90 of Figure 7. The output from the photocells is in the form of a direct current and enters the amplifier through a low pass T network consisting of a pair of series connected resistors 133 and 134 and a condenser 135 connected between the said resistors and the ground lead 132. Inasmuch as it is more convenient to amplify an alternating current signal than a direct current signal, a vibrator or chopper 127 is interconnected with the output of the resistor 134 to transform the signal into an alternating one. This vibrator consists of a vibrating armature 136 and a contact arm 137 which is moved thereby. A pair of contacts 138 and 139 mounted for cooperation with the contact arm 137 are connected to each side of a primary winding 140 of the input transformer 141. The center tap of winding 140 is grounded to lead 132 and the output of the resistor is connected to the armature contact arm 137. As the contact arm 137 is insulated from the armature 136 and vibrates back and forth between the contacts 138 and 139 the resistor 134 is connected first to one side of the primary winding 140 and then to the other side which produces an alternating signal in the secondary winding 142 of the transformer 141. The armature 136 of the vibrator 137 is grounded by means of a ground wire 143. Oscillation of the armature 136 is obtained by means of a winding 144 which is energized by the low voltage transformer winding 126. To avoid under circuit complication the actual connections between these two windings have been omitted.

The alternating signal appearing in the secondary winding 142 of the input transformer 141 is fed to the grid 145 of the first triode section of tube 120, and the other side of the winding is connected to ground by a lead 146. A load resistor 147 is shunted across the winding 142 and a condenser 148 is connected between the grid 145 and ground to filter out any unwanted high frequency noise which may appear at this point in the circuit. The cathode 149 is connected to ground by means of a cathode resistor 150 and bypass condenser 151 and provides the bias for this triode section. The voltage for the plate 152 is supplied by the winding 129 of transformer 124. One side of this transformer is connected directly to the ground lead 143 while the other side is connected through a lead 153 to the plate 154 of tube 121. The grid 155 and cathode 156 of this triode section are connecetd together and form the positive side of the D.-C. supply. This voltage is filtered by means of a lowpass filter consisting of resistors 157 and 158 connected in series with the cathode 156 of tube 121, and condensers 159, 160 and 176. The condenser 159 is connected between the midpoint of resistors 157—158 and ground, while the condenser 160 is connected between the output side of resistors 157—158 and ground. The plate 152 of the first triode section of tube 120 is connected through a load resistor 161 to the output side of the filter resistor 158 to provide a highly filtered direct current voltage for the tube.

The signal appearing at the plate 152 of tube 120 is further amplified by the second triode section of tube 120 and is fed to this section by means of a coupling condenser 162 connected between the plate 152 and the grid 163. The cathode 164 is connected directly to ground while the grid 163 is returned to ground through a grid resistor 165. The plate 166 of this triode section is connected to the midtap of resistors 157 and 158 by means of a series resistor 167 forming the load impedance of this second triode section.

The output of the second triode section of the tube 120 is fed through a condenser 168 to one side of a volume or gain control 169. The lower side of this control or potentiometer is connected to the ground lead 143 and the sliding contactor 170 is fed to the grid 171 of the first section of tube 121. The cathode 172 of this triode section is connected to ground by a lead 173. Plate voltage for the plate 174 is obtained through the load resistor 175 which is connected to the input side of the filter resistor 157.

The final stage of amplification comprises two tubes 122 and 123 in which corresponding elements of one tube are interconnected with corresponding elements of the other tube. In this stage the four grids 177, 178, 179 and 180 are connected together and fed from the plate 174 of the tube 121 through a coupling condenser 181. A resistor 182 is connected between these grids and ground to provide a D.C. return circuit. The plates 183 and 184 of tubes 122 and 123 respectively are connected to one side of the center tapped winding 128 of transformer 124 while the plates 185 and 186 of tubes 122 and 123 are connected to the other side of this winding. The center tap of this winding is returned to ground along with the center tap of winding 126 and one side of winding 129. The two sets of cathodes 187—188 and 189—190 are connected together through a potentiometer 191 having its movable contact 192 connected to the ground lead 143. Each set of cathodes is bypassed to ground by condensers 193 and 194. The output indicator, which in the case of the yellow amplifier would be indicator 17 as shown in Figure 6, is connected across the potentiometer 191 with a resistor 195 in series therewith to limit the current flowing through the indicator. As the amplified signal appearing at the plate 174 of the tube 121 is impressed on the grids of tubes 122 and 123 a D.C. potential will be developed between the cathodes and will appear across the potentiometer 191. This voltage as measured by the indicator 17 is directly proportional to the original differential voltage produced by the photocells and appearing on the input terminals 130, 132.

As pointed out above the yellow amplifier 26 and the red-purple amplifier 27 are identical and therefore only one has been shown and described.

Figure 9:
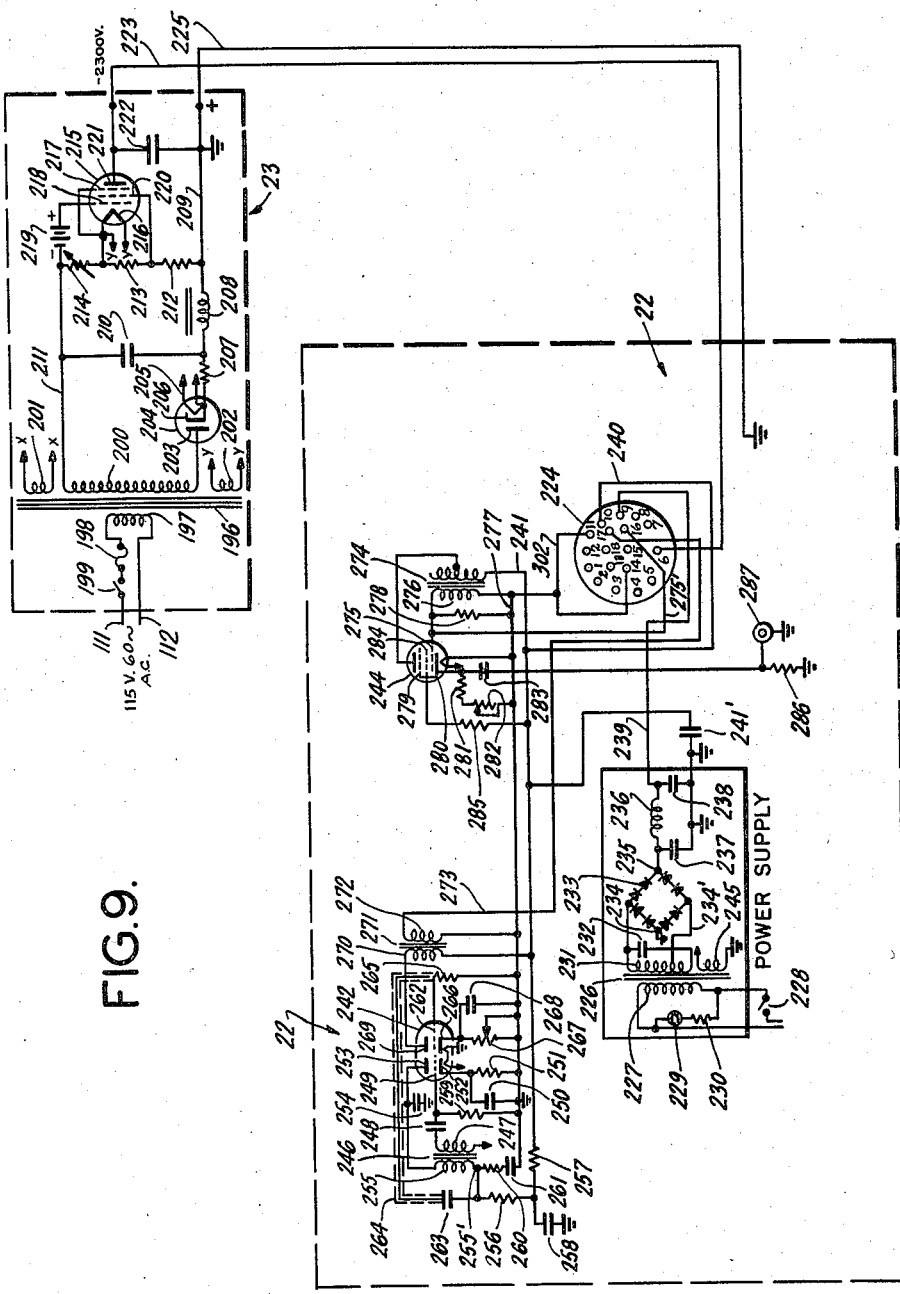
Figure 9 is a circuit diagram of the high voltage power supply and the horizontal and vertical signal generators for the image pickup tube.

The high voltage supply for the image dissector tube and the sweep generator for scanning the photocathode of the image dissector are illustrated in Figure 9. In this figure the high voltage power supply 23 comprises an input transformer 196 having a primary winding 197 connected in series with a fuse 198 and switch 199 to a source of alternating current by means of leads 111 and 112 as described in connection with Figure 7. The secondary of this transformer consists of three windings, namely a high voltage winding 200 and two low voltage windings 201 and 202. One side of the high voltage winding 200 which develops about 2300 volts negative is connected to the plate 203 of a half wave rectifier 204 in which the filament 205 is heated by the secondary winding 201 of transformer 196. The cathode 206 of this tube is connected to the filament and then through a series resistor 207 and a series choke 208 to the ground conductor 209. A filter condenser 210 is connected between the high side 211 of the transformer 200 and the junction of resistor 207 and choke 208. The D.C. voltage appearing between the output side of the choke 208 and the lead 211 is impressed across series connected resistors and rheostat 212, 213, and 214 respectively forming part of a voltage regulating circuit which includes tube 215. The filament 216 of this tube is connected to the low voltage filament winding 202 and one side is further connected to the junction of the rheostat 214 and the resistor 213. The suppressor grid 217 is also connected to this junction. The grid 218 of the tube is connected to the positive side of a 45 volt battery 219 having its negative terminal connected with the negative side of this supply which is represented by the lead 211 connected to the top side of winding 200. The screen grid 220 is connected between the junction of resistors 212 and 213. The plate 221 which forms the output terminal of the supply is bypassed to ground by a condenser 222 and is connected by means of a lead 223 to terminal No. 6 of a plug-in connector 224. The positive side of the supply is grounded as shown in 23 and connected to the sweep generator 22 by means of a lead 225.

The voltages applied between the various elements of the regulator tube 215 are adjusted so that as the plate current in the tube changes in response to changes in the output voltage that may be produced by a varying load or a varying input voltage on leads 111 and 112, the potentials between the filament 216 and the grids 218 and 220 will automatically shift to maintain the plate current and in turn the output voltage of the supply at a constant level.

The scanning generator is illustrated at 22 and includes a power supply and generating means for producing the vertical and horizontal sweep pulses for the camera tube. The power supply is of conventional arrangement having a power transformer 226 in which the primary winding 227 is fed through a switch 228 by a suitable source of alternating current. A series connected glow lamp 229 and resistor 230 are connected across the primary winding 227 as a pilot light. The high voltage secondary 231 of the transformer 226, which is tapped in order to provide convenient means for adjusting the output voltage of the supply, is also bridged by a condenser 232 to shunt any high frequency signals at this point and prevent them from passing through the transformer 226. A full wave dry rectifier 233 is connected between one side of the secondary 231 and one of the taps such as 234' that will give the desired output voltage. This rectifier is grounded at 234 and the positive supply voltage is taken from the point 235. This voltage is filtered by a series choke 236 and a pair of condensers 237 and 238 connected between each side of the choke 236 and ground. The output side of the choke is connected by means of a lead 239 to terminal 9 of the plug-in connector 224. As will be described in connection with Figure 10, this positive voltage appearing at terminal 9 of connector 224 is transferred to terminal 9 of connector 224' in Figure 10 and after passing through the focus coil shown in that figure it is returned to terminal 10 of the connector 224' and hence terminal 10 of connector 224 of Figure 9. This terminal 10 of the connector 224 is connected through a lead 240 to the conductor 241, and the voltage is then filtered further by condenser 241' connected between conductor 241 and ground. The current drawn by the sync generating circuits of Figure 9 thus energizes the focus coil of Figure 10 which is associated with the image dissector tube.

The filaments of the tubes 242 and 244 are connected in parallel and to the filament winding 245 of transformer 226. In accordance with conventional practice one side of this winding 245 is grounded to maintain each of the filaments at ground potential. The tube 242 is a duo-triode and constitutes both the vertical oscillator and amplifier. The oscillator circuit includes the vertical oscillator transformer 246 having one side of its primary 247 connected to the ungrounded side of the filament winding 245 of the power transformer 226. The other side of this winding 247 is connected through a condenser 248 to the grid 249 of tube 242. The cathode 252 is connected to ground through an RC filter consisting of a condenser 250 and a resistor 251. The plate 253 is bypassed to ground by a condenser 254 and is returned to B+ through the secondary 255 of transformer 246, resistor 256 and resistor 257 to conductor 241. A condenser 258 is connected between the junction of resistors 256 and 257 and ground to provide further filtering of the B supply at this point. The grid 249 of the tube 242 is provided with a D.C. return path to ground in the form of a resistor 259. The circuit thus far described is the vertical oscillator circuit and its frequency is determined by the frequency of the alternating current line feeding power transformer 226.

The output terminal 255′ of the secondary winding 255 on the oscillator transformer 246 is bypassed to ground by means of a series connected resistor 260 and condenser 261. The output is then coupled to the grid 262 of the second section of tube 242 by means of a coupling condenser 263 and shielded cable 264. The grid is returned to ground through a resistor 265 and the cathode 266 is connected to ground through an RC filter consisting of an adjustable resistor 267 and a condenser 268. The amplified vertical output appears on the plate 269 of tube 242 and is fed through the primary 270 of transformer 271 to the high voltage conductor 241. The secondary 272 of this output transformer is connected to ground on one side and its other side is connected by means of lead 273 to terminal 17 of the connector 224. As will be described this voltage energizes the vertical deflection coil on the image dissector tube of Figure 10.

Figure 10:
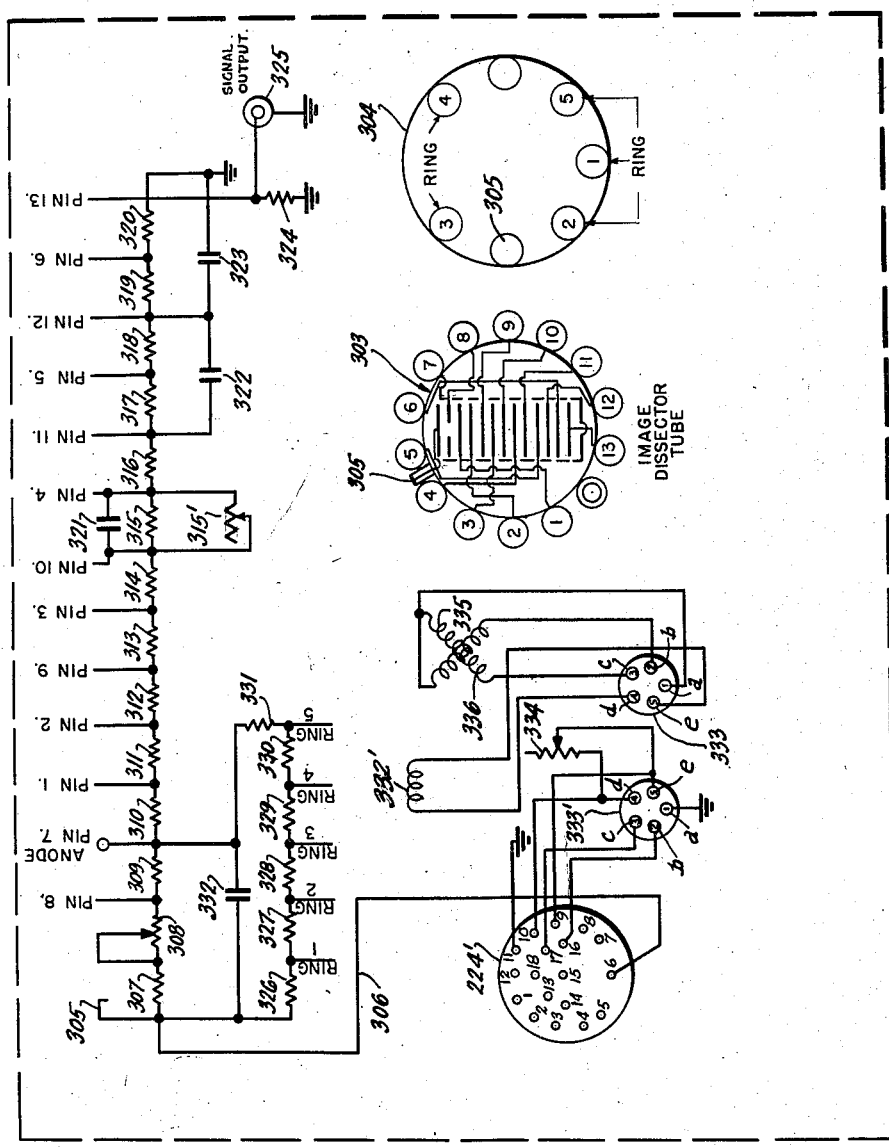
Figure 10 is a circuit diagram of the image pickup tube and associated scanning equipment.

The horizontal sync pulses are generated by the oscillator tube 244 and the horizontal oscillator transformer 274. In this circuit the grid 275 of tube 244 is connected through the winding 276 of the transformer 274 to the ground conductor 277. This winding is also shunted by a resistor 278. The horizontal deflection signal for the image dissector tube of Figure 10 is fed to terminal 16 of connector 224 from the grid 275 by conductor 275′. The suppressor grid 279 and cathode 280 are connected together and to ground through resistor 281 and rheostat 282. Condenser 283 is connected from the cathode 280 to ground through a resistor 286 across which the output horizontal sync voltage is developed. The output terminal 287 is connected to the juncture at condenser 283 and resistor 286. The screen grid 284 is connected to the D.C. voltage conductor 241 through a screen resistor 285 in the conventional manner.

Terminals 11 and 14 of connector 224 are grounded by means of lead 302. The terminal 287 to which the horizontal sync voltage is applied as described above is for the purpose of providing a signal to the leaf and preparation evaluator 25 that will also be described.

Figure 10 shows the circuitry for the image dissector tube for scanning the cotton sample. The tube is of conventional construction and is indicated diagrammatically at 303 of this figure. The photocathode end of the tube is illustrated at 304 and shows the several terminals surrounding the photocathode or light responsive surface of the tube. The operating voltages for the tube including the high voltage generated by the supply 23 are conducted to this unit by a multi-conductor cable connecting the multi-terminal plug 224 of Figure 9 with the multi-terminal plug 224′ of Figure 10. Corresponding terminals on these plugs or connectors have been denoted by like numerals. For simplicity, the actual connections between the voltage divider in the upper part of this figure and the diagrammatic representations of the tube 303 and 304 have been omitted and corresponding terminals have been denoted by like numbers.

The high voltage, which may be of the order of —2300 volts, is applied to the cathode 305 by means of a lead 306 connected to pin 6 of connector 224′. The cathode which appears on both schematic views 303 and 304 of the tube as well as in the upper left hand corner of the diagram is connected to pin 8 of the tube 303 by a resistor 307 in series with adjustable rheostat 308 which controls width of scanning. Resistors 309 through 320 are series connected and provide voltages of various magnitudes for tube elements represented by pins 7, 1, 2, 9, 3, 10, 4, 11, 5, 12 and 6 with pin 6 being less negative and pin 7 being more negative. Resistor 320 connects pin 6 to ground while pin 13 is connected to ground through load resistor 325. The output signal is obtained from pin 13 of the tube and connected to terminal 325. Pins 11 and 12 are bridged by a condenser 322 and pin 12 is bypassed to ground by a condenser 323. Pins 4 and 10 of the tube are also bridged by a condenser 321. Resistor 315 is paralleled by adjustable resistor 315′, acting as a gain control to prevent overloading of the multiplier.

The connections 1 to 5 shown as the field shaping rings shown on the tube end 304 are provided with negative voltages provided by series connected resistors 326 to 331 forming a voltage divider between the cathode 305 and anode pin 7 of the tube. The voltage divider is bypassed by a condenser 332 and the taps on the divider are marked Ring 1 to Ring 5 to correspond with the terminals Ring 1 to Ring 5 on the tube end 304.

The focus coil 332′ is used to focus the electron flow within the image dissector tube 303—304 in the conventional manner. It is connected to terminals d and e of connector 333 and through like terminals of connector 333′ to terminals 9 and 10 of connector 224′. As previously described this places the coil in series with the B supply of Figure 9 and the load produced by the tubes of that figure energizes the coil. The current flowing through the coil is controlled by a rheostat 334 connected between terminals d and e of connector 333′. The vertical deflection coil 335 is connected between terminals a and c of connectors 333 and 333′ and thence between terminal 17 of connector 224′ and ground. The horizontal deflection coil 336 is connected between terminals a and b of connectors 333 and 333′ and hence between terminal 16 of connector 224′ and ground.

Figure 11:
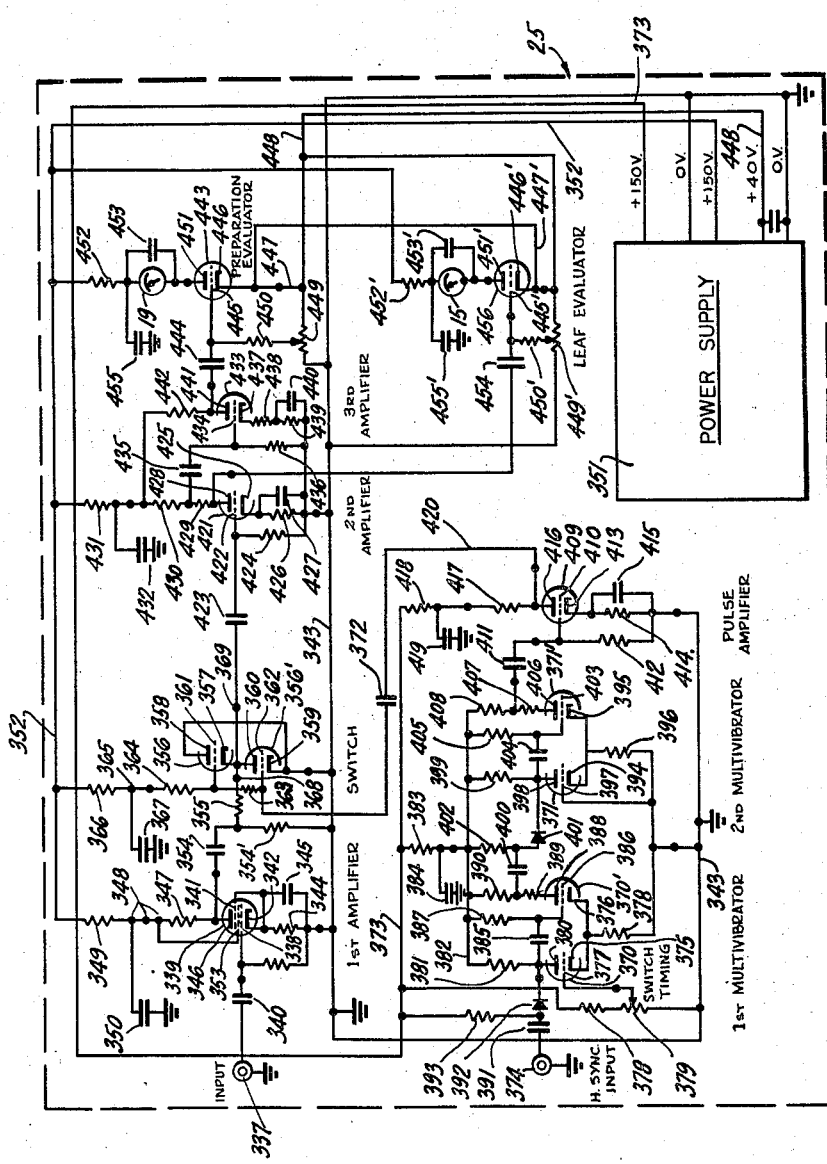
Figure 11 is a circuit diagram of measuring circuits responsive to the scanning apparatus of Figure 10 in accordance with the invention.
Figure 12:
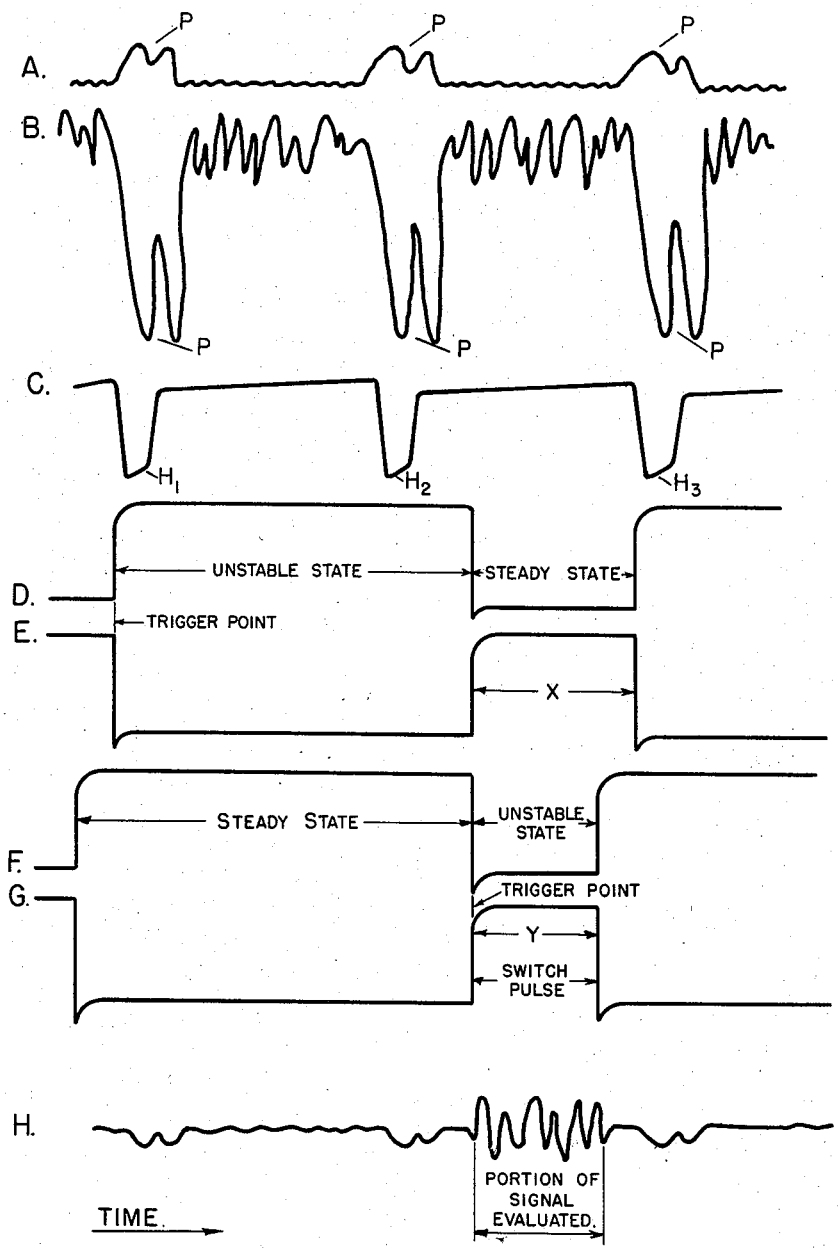
Figure 12 is a graphical representation of signals produced at various points in the circuit of Figure 11.

As discussed in connection with Figure 6, the leaf and preparation evaluator 25 receives the video signal from the image dissector tube 303 of Figure 10 and also a horizontal sync pulse from the scanner power unit 22 of Figure 9. The evaluator 25 not only separates signals indicating leaf and trash content from signals showing the uniformity of preparation of the sample, but also acts to eliminate extraneous signals in the video signal that would seriously affect the accuracy of the resultant readings. Actual tests have indicated that of each horizontal scanning trace on the image dissector tube approximately 75 to 80 percent of the corresponding video signal is useable and is proportional to the light reflected from the portion of the sample being scanned. Curve A of Figure 12 is representative of the video signal that appears on terminal 325 of Figure 10 and shows the periodic pulses P which appear to be the result of stray coupling between the output circuit of the image dissector tube and the sweep circuits. The elimination of these unwanted pulses P will be discussed in connection with the evaluator circuit of Figure 11 now to be described.

In the evaluator 25 the video signal is fed to the input terminal 337 over a shielded or suitable coaxial line not shown in this figure. Terminal 337 is connected to the grid 338 of the pentode amplifier tube 339 through a coupling condenser 340. The circuit of this tube is of conventional arrangement with the suppressor grid 341 connected to the cathode 342 which in turn is tied to the ground conductor 343 through an RC filter consisting of resistor 344 and condenser 345 to provide grid bias for the tube. The plate 346 is connected to the B+ conductor 352 (+150 v.) of the self contained conventional power supply 351 by means of load resistor 347 and filter resistor 349. A filter condenser 350 is connected between the juncture (terminal 348) of these resistors and ground to provide additional filtering for the plate voltage appearing at terminal 348. The screen grid 353 is connected directly to terminal 348. With this arrangement the signal appearing at the plate 346 is merely an amplified version of the input signal and is graphically presented in Figure 12 as curve B. It will be noted that the phase is reversed and the pulses P are of substantially greater amplitude.

This amplified signal is then fed through the coupling condenser 354 appearing across resistor 354' and thence through a resistor 355 to a twin triode switch circuit including triode sections 356 and 356'. As will be described, this switch circuit is operated to transmit the wanted portions of the video signal and to block the unwanted portions including the pulses P of curve B in Figure 12. The triode sections 356 and 356' of the switching tube are connected in opposition with the cathode 357 of the first tube connected to the plate 360 of the second tube and the plate 358 of the first tube is connected with the cathode 359 of the second tube. The grids 361 and 362 are connected one to the other through a resistor 363 while grid 361 is in turn connected through a grid resistor 364 to terminal 365 of an RC filter comprising resistor 366 connected between terminal 365 and the B+ conductor 352 and filter condenser 367 connected between terminal 365 and ground. The cathode 359 of tube 356' is also connected to ground via conductor 343.

The voltage applied to the grids of the switching tube is adjusted so that both triode sections normally draw current and therefore act as a short circuit between terminal 368 of resistor 355 and ground. This action blocks the amplified video signal produced by tube 339.

The electronic switch above described is controlled by a pair of multivibrator circuits comprising two twin triode tubes 370, 370' and 371, 371' which apply a negative pulse through tube 409 and coupling condenser 372 to grid 362 of tube 356' to cause the switching tubes to cease conducting during the wanted portion of every alternate horizontal scanning line of the image dissector tube and to eliminate the edges as well as the flyback portion of the video signal.

Electronic switching circuits of themselves often cause difficulty by producing switching transients which in this invention would of course materially affect the readings and cause a substantial error in the measurements. It was found that the insertion of resistor 363 between the two grids cured this defect when the switching pulse was fed to grid 362. In effect this procedure balanced the interelectrode capacities of the two triode sections and resulted in the complete elimination of the switching transient.

Considering now the generation of the switching pulse, the first multivibrator is a conventional cathode coupled circuit synchronized by the horizontal sync signal applied to terminal 374 and labeled "H. Sync Input." More specifically the cathodes 375 and 376 of tubes 370 and 370' are connected together and to ground through resistor 378 and conductor 343. A positive voltage is applied to grid 377 by means of voltage divider comprising fixed resistor 378 and potentiometer 379 connected in series between the B supply conductor 373 and ground conductor 343. The plate 380 of tube 370 is supplied with a positive voltage through a load resistor 381 connecting it with conductor 382. The latter conductor is connnected to the supply by means of filter resistor 383 and conductor 373. A filter condenser 384 is tied between the output side of resistor 383 and ground. The plate 380 is also connected through coupling condenser 385 to grid 386 of tube 370' and the latter is supplied with a positive voltage by means of resistor 387. The plate 388 of tube 370' is coupled to the positive conductor 382 by means of a pair of series connected resistors 389 and 390. With the circuit as described and with the proper choice of components, it can be tripped by a control signal and therefore produce an oscillation in synchronism with that signal. The timing pulse or control signal which in this case is the horizontal sync pulse appears at terminals 374 and is fed to the plate 380 by means of the condenser 391 and rectifier 392. This control signal is polarized by the application of a positive voltage through resistor 393 to one side of rectifier 392 to produce a signal having the proper potential for application to the plate 380.

This first multivibrator circuit is roughly timed by condenser 385 and resistor 387 and is more accurately timed by the adjustment of the bias on grid 377 by means of the potentiometer 379. The timing is adjusted so that the circuit returns to its original stable state a short time after the receipt of the horizontal pulse following the tripping pulse H of Figure 12c. This action will probably more clearly be observed in curves D and E of Figure 12. Curve E represents the output of plate 380 of the first section of the 1st multivibrator while curve D of reversed phase appears at the plate 388 of the second triode. Curve E shows a negative excursion of the signal during the unstable state of the vibrator and at a short time later but prior to the next alternate horizontal pulse $H_3$ (curve C) settles down to a short stable state period "X." As will become apparent, the instant of return of this 1st multivibrator section to a steady state marks the beginning of a switching pulse that will permit the video signal to pass through the electronic switch.

The second multivibrator circuit includes triode sections 371 and 371' and in effect determines the duration of the switching pulse. The circuit is similar to the first multivibrator except for slightly different component values. The cathodes 394 and 395 are connected to ground through resistor 396 and conductor 343 while the grid 397 of the first triode is connected directly to ground. The plate 398 is connected to the positive voltage conductor 373 by means of a load resistor 399 and is controlled by the output of the first multivibrator by series connected condenser 400 and rectifier 401 interposed between the juncture of resistors 389 and 390 and the plate 398 of tube 371. The signal is polarized by the resistor 402 connected between the lead 382 and the input of rectifier 401. Plate 398 is coupled to the grid 403 of tube 371' through condenser 404 which in turn is connected to the positive voltage source conductor 382 by means of the grid resistor 405. The plate 406 is positively energized through a voltage divider consisting of resistors 407 and 408.

This second multivibrator circuit is timed only by the RC timing circuit consisting of condenser 404 and resistor 405 and is set so that the triggered portion of its operation lasts somewhat less than the usable part of the video signal as previously described. Curve F of Figure 12 shows the nature of the signal at the plate 398 of triode 371 while curve G is the signal appearing at the plate 406 of tube 371'. As the two multivibrators are connected in cascade the output of the first multivibrator as represented by curve D feeds the second multivibrator. The first multivibrator is triggered by the first horizontal pulse $H_1$ (curve C) and attains a steady state at a predetermined later time when it produces a negative pulse on curve D during time "X," which is the steady state. Note that this pulse "X" is between horizontal pulses $H_2$ and $H_3$ so that horizontal pulse $H_2$ is eliminated. Horizontal pulse $H_3$ operates to repeat this action. Now the negative pulse of curve D, during the time "X" triggers the second multivibrator to produce the positive pulse "Y" or switch pulse of curve G having a time interval determined by the constants of its circuit. In this way every other horizontal pulse produces a repetition of this action and thus not only eliminates the unwanted portions of the video signal P of curves A and B but also eliminates or shunts the video signal during every other scanning line on the image dissector tube. The part of the original signal evaluated is shown on curve H and is coincident with the duration of the switch pulse "Y" of curve G.

As previously pointed out, a negative pulse is required to operate the switch tube 356—356' and it is also desirable to isolate the multivibrator circuit from the switch. For this purpose a triode 409 is used in a conventional amplifier circuit. The output of the multivibrator circuits is taken from the junction of resistors 407 and 408, to obtain a reduced signal voltage and fed to grid 410 through a coupling condenser 411. The grid is returned to ground 343 by means of resistor 412 and the cathode 413 is biased by an RC filter comprising resistor 414 and condenser 415 connected between it and ground. The circuit for the plate 416 includes the load resistor 417 and filter resistor 418 to the positive voltage supply conductor 373. Condenser 419 between resistor 418 and ground provides further filtering for the voltage on plate 416 and isolates it from the other circuits operated by the same voltage source. The output of plate 416 which is in the form of a negative pulse is fed to the switch tube through lead 420 and condenser 372 as previously described.

While a specific form of pulse generating system has been described it is apparent that any other suitable system may be used that will produce a similar result. In addition, other switch circuits could also be employed that meet the aforestated requirements.

The treated video signal now appears at terminal 369 of the switch circuit previously described and is fed to the grid 422 of a second amplifier tube 421 by means of coupling condenser 423. The grid is returned to ground by means of resistor 424 and the cathode 425 is biased by the resistor 426 and condenser 427 connected between the cathode and ground 343. The plate circuit includes the plate 428, load resistors 429 and 430 and filter resistor 431 to the voltage supply lead 352. The filter condenser 432 between resistor 431 and ground forms an RC isolating filter for tube 421.

The second amplifier tube 421 merely amplifies the video signal and in turn drives both the preparation evaluator circuit and leaf evaluator circuit. It was previously mentioned that leaf and trash content of the sample being tested produced a video pulse in one direction while improper preparation produced a pulse in the other direction. This therefore comprises the basis on which these two indications are separated.

In the embodiment of the invention thus far described, the signals produced at the plate of the second amplifier tube 421 representing the lack of uniformity of preparation are negative excursions. These excursions are reversed in phase for the preparation evaluator by means of a triode tube 433 having a grid 434 fed from a point between resistors 429 and 430 and through a blocking condenser 435. The grid is connected to ground 343 by means of resistor 436 and the cathode is biased by resistors 438 and 439 connected between it and ground. Condenser 440 bypasses only resistor 439 and thus the voltage developed across resistor 438 provides a small amount of inverse feedback in this tube to reduce the gain and possibly improve its response. The plate 441 is connected through the load resistor 442 to the juncture of resistors 430 and 431 to provide a positive voltage. The output of plate 441, which while containing both positive and negative excursions, has reversed the phase of the signal from the second amplifier so that preparation signals are in the positive direction. These signals are fed to the grid 445 of the clipper tube 443 through the condenser 444. The cathode 446 is connected to the +40 volt terminal of the power supply 351 by leads 447 and 448 and to ground 343 through a potentiometer 449. The grid 445 is connected through resistor 450 to the movable contact on potentiometer 449 so that it can be biased negatively to cut off and thus eliminate any negative pulses appearing on the grid 445. The plate circuit includes the plate 451, preparation indicator 19, resistor 452 and lead 352 to the power supply. Resistor 452 is bypassed to ground through the filter condenser 455. The meter or indicator 19 is of course preferably bypassed by a small condenser 453 to smooth out the pulses and produce a constant reading.

Since this clipper tube 443 is biased to cut off it will not draw current through meter 19. However, upon the application of a positive pulse to the grid it will draw current in proportion to the amplitude of the signal and that current will be proportional to the uniformity of preparation of the sample. By properly calibrating the meter 19, direct readings can therefore be obtained.

The leaf evaluator circuit is similar to the preparation evaluator circuit except for the omission of the third amplifier tube. It was pointed out above that the output of amplifier tube 421 included positive signals for leaf and trash content and negative signals for non-uniform preparation. Therefore the clipper tube 456 of the leaf evaluator circuit can be fed directly from the plate 428 of tube 421 through its blocking condenser 454. As this clipper circuit is identical to the one previously described, primed numbers of this circuit correspond to the unprimed numbers of the circuit for clipper tube 443 and the same description applies to both circuits.

In certain cases, and especially during the warmup period, the meters 15 and 19 indicating leaf content and uniformity of preparation may be subjected to relatively large excursions. To prevent this a pushbutton having normally closed contacts can be connected across each meter in series with a resistor. In this way the meter will give a small indication to show that the equipment is operating and the button can be pressed to obtain the true readings. Similar protective pushbuttons may be used on all meters and are denoted by the numerals 15' to 19' inclusive on the panel 14 of Figure 1.

While only one embodiment of the invention has been described it is obvious that numerous changes and modifications may be made without departing from the true scope and spirit thereof.

What is claimed is:

1. Grading apparatus for material comprising means for illuminating a sample of said material, light sensitive means for indicating the total light reflected from at least one predetermined area of the material, second light sensitive means including at least one filter therefor for indicating the total quantity of light reflected from said area of the material within a predetermined part of the visible spectrum and means for scanning said area of the illuminated material including indicating means to register the irregularities of the reflective properties of said area of the material.

2. Grading apparatus for material comprising means for illuminating a predetermined area of said material, light sensitive means including an indicator therefor to register the total quantity of light reflected from at least one predetermined area of said sample, means including at least two light sensitive cells and indicators therefor for individually registering the total quantity of light reflected from said area of said sample within at least two different color ranges of the visible spectrum, and means for scanning said area of the illuminated material including indicating means for registering the irregularities of the reflective properties of said material.

3. In an apparatus for grading material, means for measuring the irregularities of its reflective properties comprising means for illuminating one predetermined area of the material, means including a light sensitive device for scanning said illuminated area of said material to produce electric signals corresponding to variations in reflectance of said material, indicating means responsive to signals corresponding to increased reflectivity of parts of said illuminated area of material to indicate the quality of the preparation of the material and second indicating means responsive to signals corresponding to decreased reflectivity of parts of said illuminated area of said material to indicate leaf and trash content thereof.

4. In an apparatus for grading material, means for measuring the irregularities of its reflective properties comprising means for illuminating a predetermined area of the material, means including a light sensitive device for scanning said illuminated area of said material to produce electric signals corresponding to variations in reflectance of said area of said material, indicating means responsive to changes of said signals in one direction to indicate the uniformity of preparation of the material and second indicating means responsive to changes of the signal in the other direction to indicate leaf and trash content of the material.

5. Grading apparatus for material comprising means for illuminating a sample of said material, light sensitive means including an indicator therefor to register the total quantity of light reflected from at least part of said sample, means including at least two light sensitive cells and indicators therefor for individually registering the total quantity of light reflected from at least part of said sample within at least two different color ranges of the visible spectrum, and means for measuring variations in the uniformity of the reflective properties comprising means including a light sensitive device for scanning at least part of the illuminated area of said material to produce electric signals corresponding to the non-uniformity of reflectance of said material, indicating means responsive to signals corresponding to increased reflectivity of parts of said material and second indicating means responsive to signals corresponding to decreased reflectivity of parts of said material.

6. In an apparatus for grading material, means for measuring the variations in the uniformity of its reflective properties contained therein comprising means for illuminating a predetermined area of said material, an image pickup tube having a photocathode and means for electronically scanning said cathode, means for focussing an image of said illuminated area of said material on said photocathode, said electronic scanning means producing electric signals corresponding to parts of said area of increased reflectivity and parts of said area of decreased reflectivity, indicating means responsive to signals corresponding with increased reflectivity to register the irregularities of preparation of said sample and indicating means responsive to signals corresponding with decreased reflectivity to register the quantity of foreign matter in said sample.

7. Means for measuring the irregularities in the reflectance properties of materials comprising means for illuminating a predetermined area of the material, an image pickup tube having a photocathode and electron scanning means for scanning said cathode to produce signals corresponding to light and dark areas of an image focussed thereon, means for focussing an image of said illuminated area of the material on said photocathode, an amplifier for amplifying signals produced in response to the image of said area of said material of said photocathode, indicating means responsive to signals corresponding to light parts of said area of high reflectivity to register the irregularities in preparation of said area of said material and indicating means responsive to signals corresponding to parts of said area of low reflectivity to register the quantity of foreign matter in said area of said material.

8. Means for measuring the uniformity of the reflectance properties of materials comprising means for illuminating the material, an image pickup tube having a photocathode and electron scanning means for scanning said cathode to produce signals corresponding to light and dark areas of an image focussed thereon, means for focussing an image of the material on said photocathode, an amplifier for amplifying signals produced in response to the image of said material on said photocathode, indicating means responsive to signals corresponding to light areas of high reflectivity to register the uniformity of preparation of said material and indicating means responsive to signals corresponding to dark areas of low reflectivity to register the quantity of foreign matter in said material, said amplifier including an electronic switch operable to interrupt said amplified signals, electronic timing means responsive to said scanning means to produce electric pulses corresponding in time and duration with the movement of said scanning means over at least part of said image and coupling means between said switch and timing means to permit signals to pass through the switch for the duration of said pulses whereby said indicators will respond only during the periods determined by said pulses.

9. Means for measuring the uniformity of light reflectance of material comprising means for illuminating a predetermined area of said material, means for scanning said illuminated area of said material to produce electric signals corresponding to parts of said area of increased and decreased reflectance and indicating means for separately registering signals corresponding to said parts of increased reflectance and signals corresponding to said parts of decreased reflectance.

10. Apparatus for scanning material to determine the uniformity of its light reflecting properties comprising means for illuminating said material, an image pickup tube having a photosensitive surface, a lens for focussing the image of said material on said photosensitive surface, means for scanning said photosensitive surface responsive to light and dark areas of said image to produce corresponding electric signals, including electronic means for rapidly scanning over said image in successive spaced linear paths to cover the entire area thereof, amplifying means for said signals, an electronic switch interconnected with the amplifier to selectively block said signals, electronic timing means for producing periodic pulses to actuate said switch, means in said timing means responsive to said electronic scanning means to operate said timing means to produce said pulses with a periodicity and duration corresponding to the translation of said scanning over said image during at least part of every other linear path, coupling means between said timing means and said switch to actuate the latter during the period of each of said pulses, indicating means including polarity selective apparatus for registering signals corresponding to lighter portions of the image and indicating means including polarity selective apparatus for registering signals corresponding to the darker portions of the image.

11. Apparatus according to claim 10 wherein each indicator includes an integrating circuit for producing a registration corresponding to the average value of the signals impressed on said indicators.

12. In an apparatus for grading material, means for examining a sample of said material comprising a light proof housing, a transparent window in said housing over which the material to be examined is placed, at least one light source within the housing for illuminating a predetermined area of said sample placed over said window, an image scanning tube including a light proof shield between the scanning tube and said housing and a lens in said shield for viewing said area of the sample, means within said housing to shield said lens from direct rays of light from said lamp, a plurality of photoelectric means having light sensitive surfaces directed toward said illuminated area of the sample and shielded from said lamp and separate photoelectric means having a light sensitive surface positioned to receive light directly from said lamp.

13. In an apparatus for grading material, means for examining a sample of said material comprising a light proof housing, a transparent window in said housing over which the material to be examined is placed, at least one light source within the housing for illuminating a predetermined area of the sample placed over said window, means optically communicating with said housing and in line with said window for scanning said illuminated area, a light proof shield between the lamp and said optical means, a plurality of photoelectric means having light sensitive surfaces directed toward said illuminated area of said sample and shielded from said lamp, said photoelectric means being responsive to generate signals corresponding to the intensity of reflected light in at least two different color ranges, means for adjustably positioning at least one of said photoelectric means, and at least two separate photoelectric means each having a light sensitive surface one of the last said means being positioned to receive light directly from said lamp and cooperating with the other of the last said means to measure the reflectance of said area of the material.

14. In an apparatus for grading material, means for examining a sample of said material comprising a light proof housing, a window in said housing over which the sample to be examined is to be placed, illuminating means in said housing illuminating a predetermined area of said sample placed over said window, means for registering the total light reflected from said area of said sample, and means for registering the irregularities of the reflecting characteristics over said predetermined area of said sample.

15. In an apparatus for grading material, means for examining a sample of said material comprising a light proof housing, a window in said housing over which the sample to be examined is to be placed, illuminating means in said housing directed on said window and illuminating a predetermined area of the sample, means for registering the total light reflected from said area of said sample, means for registering the total light reflected from said area of said sample within at least one color range, and means for registering the irregularities of the reflecting characteristics over said predetermined area of said sample.

16. Apparatus for grading material comprising means for illuminating a predetermined area of said material to be graded, electronic means for registering the difference between the total incident light and the reflected light from said area of said material, electronic means for registering the quantity of light reflected from said area of said material within at least one color range of the spectrum, and means for registering the irregularities of the reflective properties of said area of said material.

17. In a grading apparatus, means for determining reflectivity characteristics of an area comprising line scanning means for producing a video signal having amplitude variations corresponding to light and dark areas of the area being scanned, amplifying means for said signal, an electron switch interconnected with said amplifier for normally shunting said signal, timing means interconnected with said switch and scanning means for opening said switch during at least part of the movement of said scanning means over the actual area being scanned, indicating means including at least one electron tube connected with said switch for registering variations of said signal corresponding to regions of increased reflectivity, and second indicating means including at least one electron tube connected with said switch for registering variations of said signal corresponding to regions of decreased reflectivity.

18. In a grading apparatus, means for determining reflectivity characteristics of an area comprising scanning means for producing a video signal having amplitude variations corresponding to light and dark areas of the area being scanned, amplifying means for said signal, an electron switch interconnected with said amplifier for normally shunting said signal, timing means interconnected with said switch and scanning means for opening said switch during at least part of the movement of said scanning means over the actual area being scanned, indicating means connected with said switch for registering variations of said signal corresponding to regions of increased reflectivity, and second indicating means including at least one electron tube connected with said switch for registering variations of said signal corresponding to regions of decreased reflectivity.

19. Apparatus for scanning material to determine the uniformity of its light reflecting properties comprising means for illuminating said material, an image pickup tube having a photosensitive surface, a lens for focussing the image of said material on said photosensitive surface, means for scanning said photosensitive surface responsive to light and dark areas of said image to produce corresponding electric signals including electronic means for rapidly scanning said image in a predetermined path to cover the entire area thereof, amplifying means for said signals, and electronic switch interconnected with the amplifier to selectively block said signals, electronic timing means for producing periodic pulses to actuate said switch, means in said timing means to produce said pulses with a periodicity and duration corresponding to the translation of said scanning over said image during at least part of every other linear path, coupling means between said timing means and said switch to actuate the latter during the period of each of said pulses, indicating means including polarity selective apparatus for registering signals corresponding to lighter portions of the image and indicating means including polarity selective apparatus for registering signals corresponding to the darker portions of the image.

20. In a grading apparatus, means for determining reflectivity characteristics of an area comprising scanning means for producing a video signal having amplitude variations corresponding to light and dark areas of the area being scanned, amplifying means for said signal, an electron switch interconnected with said amplifier for normally shunting said signal, timing means interconnected with said switch and scanning means for opening said switch during at least part of the movement of said scanning means over the actual area being scanned, indicating means connected with said switch for registering variations of said signal corresponding to regions of decreased reflectivity.

21. Grading apparatus for material comprising means for illuminating a sample of said material, light sensitive means including an indicator therefor to register the total quantity of light reflected from at least part of said sample, means including at least two light sensitive cells and indicators therefor for individually registering the total quality of light reflected from at least part of said sample within at least two different color ranges of the visible spectrum, and means for measuring variations in the uniformity of the reflective properties comprising means including a light sensitive device for scanning at least part of the illuminated area of said material to produce electric signals corresponding to the non-uniformity of reflectance of said material, and indicating means responsive to signals corresponding to decreased reflectivity of parts of said material.

22. Means for grading fibrous material including cotton, wool and the like, comprising means for illuminating a predetermined area of said material, light-sensitive means including an indicator therefor to register the total quantity of light reflected from said illuminated area, means including at least two light-sensitive cells and indicators therefor for registering the light reflected from said illuminated area and within at least one color range of the visible spectrum and means for measuring variations in the uniformity of the reflective properties comprising means including a light sensitive device for scanning said illuminated area of said material to produce electric signals corresponding to the non-uniformity of reflectance of said material and indicating means responsive to signals corresponding to areas of decreased reflectivity for measuring the proportion of foreign matter that may be contained in said illuminated area.

References Cited in the file of this patent

UNITED STATES PATENTS

| | | |
|---|---|---|
| 1,961,913 | Reynolds et al. | June 5, 1934 |
| 2,050,486 | Davis et al. | Aug. 11, 1936 |
| 2,405,133 | Brown | Aug. 6, 1946 |
| 2,411,486 | Weisglass | Nov. 19, 1946 |
| 2,467,057 | Simmon | Apr. 12, 1949 |
| 2,561,197 | Goldsmith | July 17, 1951 |
| 2,574,264 | Hunter | Nov. 6, 1951 |
| 2,589,270 | Mayle | Mar. 18, 1952 |
| 2,614,218 | Hancock | Oct. 14, 1952 |
| 2,619,594 | Golbberg | Nov. 25, 1952 |
| 2,633,528 | Hutson | Mar. 31, 1953 |
| 2,645,971 | Herbst | July 21, 1953 |
| 2,696,750 | Hunter | Dec. 14, 1954 |
| 2,739,246 | Hunter | Mar. 20, 1956 |

FOREIGN PATENTS

| | | |
|---|---|---|
| 373,058 | Germany | Apr. 7, 1923 |
| 689,792 | Great Britain | Apr. 8, 1953 |